United States Patent [19]

Johnson

[11] 4,337,584
[45] Jul. 6, 1982

[54] HEAT PUMP GRAIN DRYER

[76] Inventor: Lawrence D. Johnson, R.R. 1, Glenburn, N. Dak. 58740

[21] Appl. No.: 184,335

[22] Filed: Sep. 5, 1980

[51] Int. Cl.³ .................................. F26B 17/14
[52] U.S. Cl. ............................. 34/65; 34/77; 34/169; 34/174
[58] Field of Search ................. 34/27, 77, 65, 169, 34/174

[56] References Cited

U.S. PATENT DOCUMENTS

| 1,502,858 | 7/1924 | Little, Jr. | 34/65 |
| 1,711,574 | 5/1929 | Miller | 34/174 |
| 3,875,683 | 4/1975 | Waters | 34/174 |
| 4,134,216 | 1/1979 | Stevens | 34/27 |
| 4,205,456 | 6/1980 | Ayers et al. | 34/77 |
| 4,257,169 | 3/1981 | Pierce | 34/77 |
| 4,289,481 | 9/1981 | Yano | 34/174 |

FOREIGN PATENT DOCUMENTS 1138321  6/1957  France .................. 34/77

Primary Examiner—Larry I. Schwartz
Attorney, Agent, or Firm—Harvey B. Jacobson

[57] ABSTRACT

Structure is provided defining a flow path for granular materials to be dried and laterally through which drying air may be passed. The flow path includes inlet and outlet end portions and supply means is provided for supplying granular material to the inlet end portion and discharge means is provided for discharging granular material from the outlet end portion. Air passage structure is provided including means for passing heated drying air laterally through the inlet end portion of the flow path and cooled drying air laterally through the outlet end portion of the flow path. The air passage structure includes a substantially closed loop circuit and pump structure for pumping air through the circuit. Also, the air passage structure includes heating structure for heating the drying air immediately prior to its passage laterally through the inlet end portion of the flow path and cooling structure for cooling and dehumidifying the drying air after its passage laterally through the inlet end portion of the flow path and prior to its passage laterally through the outlet end portion of the flow path. Still further, the air passage structure includes bypass structure operative to cause variable amounts of the drying air within the circuit to bypass the outlet end portion of the material flow path. Further, structure is provided to obtain and maintain subatmospheric pressure in the drying chamber.

8 Claims, 1 Drawing Figure

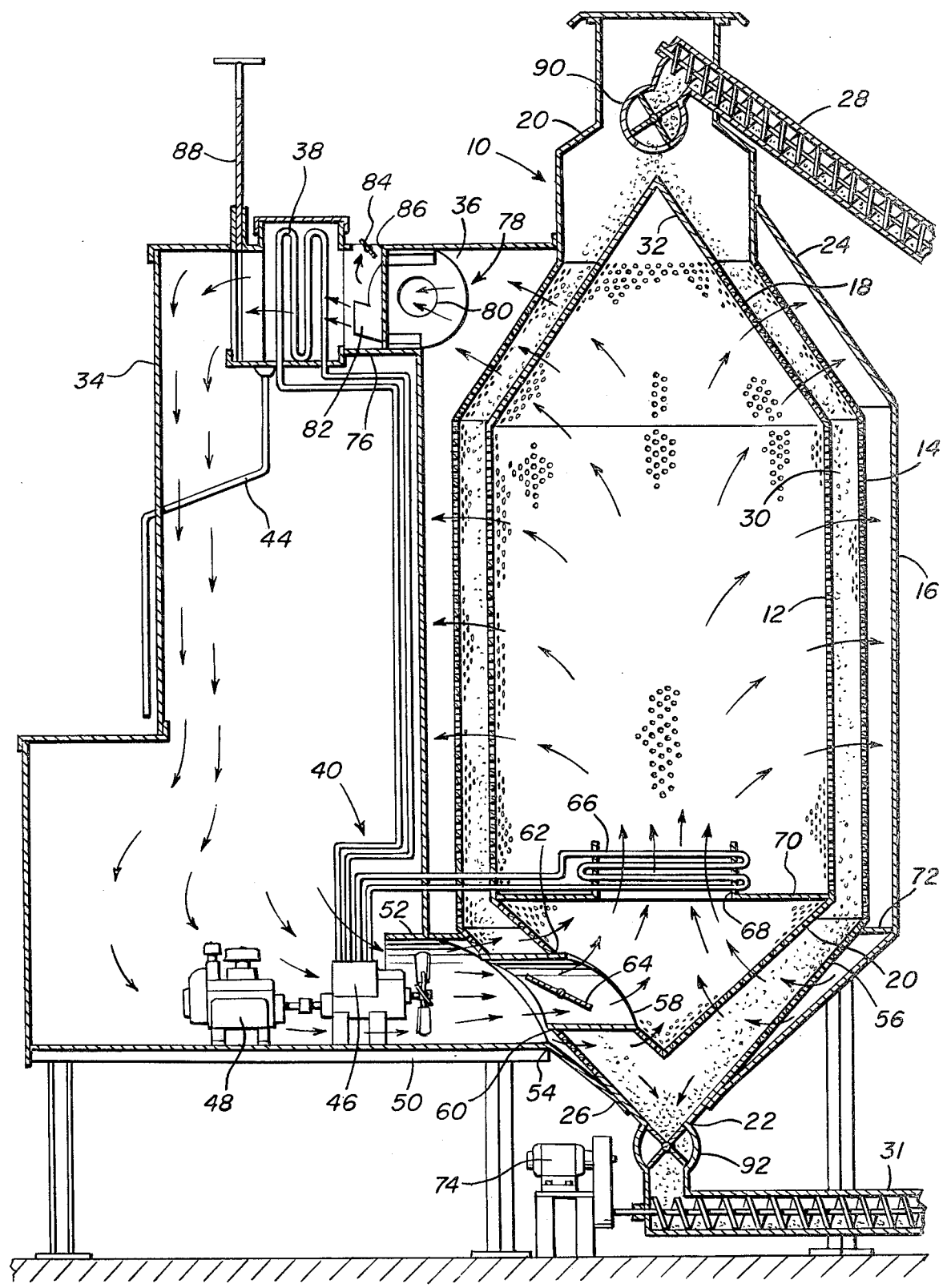

4,337,584

HEAT PUMP GRAIN DRYER

BACKGROUND OF THE INVENTION

Various forms of grain dryers heretofore have been provided. For the most part, grain dryers cause heated drying air to pass through grain to be dried. However, if the grain is retained in the dryer in a heated condition or is withdrawn from the dryer in a heated condition certain ambient temperature and humidity conditions tend to cause the grain to mildew, especially if the grain is discharged from the dryer at a temperature higher than ambient temperature. Also, inasmuch as conventional grain dryers tend to discharge grain from the dryer at a temperature higher than ambient temperature, considerable energy loss from the drying system is inherent due to the discharge of hot grain from the dryer. Accordingly, a need exists for a grain dryer which may be operated more efficiently and which will be capable of discharging grain from the dryer at a temperature no greater than ambient temperature and less than ambient temperature, if desired.

Examples of various forms of previous known grain dryers, including some of the general structural and operational features of the instant invention, are disclosed in U.S. Pat. Nos. 3,233,337, 3,739,487, 3,931,683, 4,004,351, 4,134,216 and 4,144,654.

SUMMARY OF THE INVENTION

The dryer of the instant invention includes a conventionally shaped upstanding cylindrical body including an upwardly tapering conical top and a downwardly tapering conical bottom. The body includes an outer shell, an inner perforated shell and an intermediated perforated shell spaced between the inner shell and the outer shell. The space between the inner and intermediate perforated shells defines a gravity flow grain path for grain to be dried and structure is provided for supplying grain to be dried to the upper portion of the gravity flow path. Further, structure is provided for discharging dried grain from the lower end of the gravity flow path.

The body additionally includes an inner partition within the inner perforated shell at a level spaced above the lower end thereof and an outer partition extending between the intermediate shell and the outer shell in general horizontal alignment with the inner partition. Air passage structure is operatively associated with the outer shell and includes air pump means for pumping air from the upper portion of the interior of the outer shell above the partitions and into the lower portion of the interior of the outer shell below the partitions. Heat pump or air conditioning structure including an evaporator and a condenser are operatively associated with the dryer and the condenser is mounted within an opening formed in the inner partition and the evaporator is mounted in the air passage structure between the outlet from the upper end portion of the interior of the outer shell and the lower end portion of the interior of the outer shell.

In this manner, the upper and lower portions of the gravity flow path for grain to be dried are subject to heated drying air and cool dehumidified air, respectively, and a single power source may be utilized to drive the compressor of the heat pump or air conditioning unit and may therefore be used for both heating and cooling purposes in an efficient manner. The compressor for the air pump or refrigeration unit may be driven from an external power source, such as the power take off of a tractor, or may be driven by an internal combustion engine or electric motor disposed within the air passage structure to thereby provide increased heating capacity to the drying air, if desired.

The main object of this invention is to provide a grain dryer which will be operative not only to dry grain passing therethrough, but also to cool the grain immediately prior to its discharge from the dryer.

Another object of this invention is to provide a grain dryer which may utilize the condensing and evaporator units of a heat pump or refrigeration system for heating and cooling and dehumidifying the drying air to be used in drying the grain being processed.

Still another important object of this invention is to provide a grain dryer which may be powered through the utilization of its own power source or, alternately, it may be powered from the power take off of a farm tractor, or the like.

A further object of this invention is to provide a grain dryer in accordance with the preceding objects and which may be utilized to dry various types of grain while at sub-atmospheric pressure.

Still another object of this invention is to provide a grain dryer which may also be utilized in a continuous grain drying operation as opposed to a batch grain drying operation.

A final object of this invention to be specifically enumerated herein is to provide a grain dryer in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The single view of the drawing comprises a vertical sectional view taken substantially upon a plane passing through the center of a grain dryer constructed in accordance with the present invention.

DETAILED DESCRIPTION OF THE INVENTION

Referring now more specifically to the drawing, the grain dryer of the instant invention is referred to in general by the reference numeral 10 and includes a pair of inner and outer loosely telescoped and perforated tubular members 12 and 14. The outer tubular member 14 is enclosed within an outer shell 16 and the upper and lower ends of the inner tubular member are closed by upright and inverted conical portions 18 and 20, respectively. The upper portion of the outer tubular member is closed as at 20 and the lower portion of the outer tubular member 14 includes an outlet neck 22. The upper portion of the outer shell 16 is sealed relative to the upper portion of the outer tubular member 14 as at 24 and the lower portion of the outer shell 16 is sealed relative to the lower end of the outer tubular member 14 as at 26. A supply conveyor 28 is operative to supply grain to be dried into the interior of the outer shell 16 and a discharge conveyor 31 is operatively associated with the outlet neck 22 for controllably discharging dried grain from the dryer 10.

The space between the inner and outer tubular members 12 and 14 defines a gravity flow path 30 for grain or other granular materials to be dried and the upper end of the conical portion is imperforate as at 32. The imperforate portion 32 deflects the grain or other granular material being discharged into the upper closed end of the outer tubular member 14 to opposite sides of the vertical center line of the dryer 10 extending between the apices of the conical portions 18 and 20.

The shell 16 includes a vertical duct portion 34 disposed outwardly of one side of the shell 16 and the upper end portion of the vertical duct portion 34 opens horizontally into the upper interior portion of the shell 16 as at 36 and has the evaporator 38 of a refrigeration system referred to in general by the reference numeral 40 disposed therein. A condensate collecting tray 42 is operatively associated with the evaporator and the tray 42 drains into a drain line 44 opening outwardly of the duct portion 34. The refrigeration system 40 includes a compressor 46 driven by a power source 48 and the compressor includes a fan assembly 50 driven thereby and disposed within and inlet duct 52 which opens outwardly of the bottom of the duct portion 34 into the interior of the lower portion of the shell 16 as at 54 outwardly of the lower inverted conical portion 56 of the outer tubular member 14 which opens into the outlet neck 22. A bypass duct 58 has its opposite ends secured through generally horizontally registered openings 60 and 62 formed in the outer and inner tubular members 14 and 12 and has an adjustable flow controlling damper 64 mounted therein.

The refrigeration system 40 additionally includes a condenser 66 mounted within a central opening 68 formed in a horizontal inner partition 70 secured within and extending across the interior of the inner tubular member 12 above the lower end thereof. In addition, an annular partition 72 is disposed and connected between the lower portions of the outer tubular member 14 and the shell 16 and extends completely about the outer tubular member 14.

The refrigeration system 40 is of conventional design and may be in the form of a heat pump but includes the usual evaporator 38 and condenser 66. Also, the fan assembly 50 is driven from the compressor 46 which is in turn driven from the power source 48, the latter comprising an internal combustion engine.

The exterior shell 16 may be provided with suitable variably closable vents (not shown) if desired for intaking ambient air into the interior of the shell 16 and exhausting air from within the system. Further, the power source 48 may be omitted and the compressor 46 may be driven from an external source such as the power take off of a farm tractor, or the like. Also, the power source 48 may be substituted for by an electric motor of suitable capacity.

Substantially all portions of the inner and outer tubular members 12 and 14, except for the extreme upper portion of the outer tubular member 14 are perforated with suitable air passage openings. Also, the conveyors 28 and 31 may be driven by any suitable means, such as the electric motor 74 show in driving operative association with the discharge conveyor 31.

In operation, grain or other granular material to be dried is conveyed into the upper portion of the outer tubular member 14 by the supply conveyor 28. Grain is discharged from the lower end of the outer tubular member 14 by the discharge conveyor 31 and the motor 74 driving the discharge conveyor 31 may be under the control of a temperature and/or humidity sensor operative to sense the temperature and/or humidity of the grain being conveyed by the conveyor 31.

As the grain to be dried falls downwardly through the gravity flow passage 30 air passing upwardly through the opening 68 absorbs heat from the condenser 66 and thereafter passes laterally through the gravity flow path 30 and into the interior of the shell 16 on the exterior of the outer tubular member 14. As the heated air passes through the gravity flow path 30 and the grain moving downwardly therein, the grain is dried, and as the moist air passes from the upper portion of the shell 16 as at 36 and through the evaporator 38, the temperature of the drying air is reduced and a considerable portion of the excess moisture therein condenses on the evaporator 38 and is collected in the pan or tray 42 and drained therefrom to the exterior of the dryer 10 through the pipe or tube 44. Thereafter, the cool and dehumidified air passes downwardly through the duct portion 34 around the power source 48 and through the fan assembly 50 into the interior of the lower portion of the shell 16 below the partition 72 exteriorly of the lower conical portion 56 of the outer tubular member 14. Thereafter, the drying air, after having its temperature slightly increased, and thus its relative humidity reduced, passes laterally through the lower portion of the gravity flow path 30 below the partitions 70 and 72 and thus further dries the grain and cools the latter to a temperature no greater than ambient temperature. Thereafter, the drying air passes upwardly through the opening 68 and through the condenser 66 whereupon the drying air is further heated and has its relative humidity again reduced before again passing laterally through the upper portion of the gravity flow passage 30 above the partitions 70 and 72.

Depending upon the heat loss from the dryer 10 to the ambient air, and especially if the compressor 46 is driven by the power take off of an exteriorly disposed farm tractor, it may be necessary to reduce the amount of cooled dry air which passes laterally through the lower portion of the gravity flow path 30 below the partitions 70 and 72. In such instance, the damper 64 is opened to allow at least some of the drying air being discharged from the fan assembly 50 to pass directly from the inlet duct 52 into the interior of the lower portion of the inner tubular member 12 without passing laterally through the lower end portion of the gravity flow path 30 disposed below the inner and outer partitions 72.

The grain dryer 10 uses the same power source 48 for heating and cooling in an efficient manner and the humidity of the drying air may be closely controlled not only while heated, but also while cooled. In addition, the proportion of the discharge of drying air from the fan assembly 50 which passes laterally through the lower end portion of the gravity flow passage 30 below the partitions 70 and 72 may be variably adjusted.

In addition to the above structure, a horizontal duct portion 76 communicates the upper portion of the interior of the outer shell 16 with the upper inlet portion of the vertical duct portion 34 and contains the evaporator 38 therein. The duct portion 76 has an electric motor driven squirrel cage blower assembly referred to in general by the reference numeral 78 mounted therein including an inlet 80 opening into the upper portion of the interior of the outer shell 16 and an outlet 82 opening into the duct portion 76. In addition, the duct portion 76 includes a variable positionable damper 84 mounted in an outlet opening 86 formed in the duct portion 76 between the blower assembly 78 and the evaporator 38 and a vertically adjustable air flow throttle plate 88 is operatively associated with the outlet end of the duct portion 76 opening into the upper end of the vertical duct portion 34 in order to adjustably throttle the discharge of air from the duct portion 76 into the vertical duct portion 34.

There is a pressure differential between the inlet 80 and the outlet 82 and a considerable increase in pressure is experienced between the outlet side of the blower assembly 78 and the plate 88 resulting in a portion of the air passing through the blower assembly 78 escaping through the variably throttled opening 86. The blower assembly 78 creates a reduction of pressure within the air circulating system between the throttle plate 88 and the inlet 80 and thus the vaporization of moisture from the grain being dried is accelerated. Inasmuch as some of the air pumped by the blower assembly 78 escapes through the opening 86, any air leakage from the exterior of the dryer into the interior thereof is compensated for. In addition, the outlet end of the supply conveyor 28 includes an air lock 90 driven in timed speed ratio with the supply conveyor 28 and the outlet neck includes a similar air lock 92 driven in timed speed ratio with the discharge conveyor 31. Thus, the entrance of ambient air into the drying chamber through the conveyor assemblies 28 and 31 is prevented. Further, it is to be appreciated that the capacity of the blower assembly 78 is greater than the capacity of the fan 50. Also, when the throttle plate 88 is partially closed, the increased pressure and slower speed of air across the evaporator 38 increases the rate of condensation of the moisture from the circulating drying air.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A grain dryer including means defining a gravity flow path for granular material to be dried and laterally through which drying air may be passed, said flow path including inlet and outlet end portions, supply means for supplying granular material to said inlet end portion and discharge means for discharging granular material from said outlet end portions, air passage means including means for passing heated drying air laterally through the inlet end portion and cooled drying air laterally through said outlet end portion, said air passage means defining a substantially closed loop circuit and means for pumping air through said circuit, said air passage means including heating means for heating the drying air immediately prior to its passage laterally through said inlet end portion and cooling means for cooling and dehumidifying said drying air after its passage laterally through said inlet end portion and prior to its passage laterally through said outlet end portion, said dryer including a pair of inner and outer loosely telescoped and perforated tubular members including upper and lower ends and defining a generally annular area therebetween comprising said gravity flow path, the upper and lower ends of said inner tubular member being closed, an outer shell at least substantially enclosing said outer tubular member, an outer partition extending about said outer tubular member between the latter and said shell intermediate the upper and lower ends of said outer tubular member, an inner partition in said inner tubular member extending thereacross and having an opening formed therein, said heating means comprising heat exchange means disposed across said opening, said air passage means including the area between said outer tubular member and said shell above and below said outer partition, said air passage means including duct means for ducting air from the upper portion of the last-mentioned area above said outer partition to the lower portion of said last-mentioned area below said outer partition, said cooling means being dispose in said duct means.

2. The combination of claim 1 wherein said air passage means includes bypass means operative to effect the bypass of variable portions of said drying air around the outlet end portion of said gravity flow path.

3. The combination of claim 2 wherein said bypass means includes generally laterally registered portions of said inner and outer tubular members having openings formed therein below said outer partition and a connecting duct extending between and secured to said inner and outer tubular members about said openings.

4. The combination of claim 3 wherein said connecting duct includes valve means operatively associated therewith for variably controlling the flow of bypass air therethrough.

5. The combination of claim 1 including means for maintaining subatmospheric pressure within said gravity flow path.

6. The combination of claim 1 wherein said heating and cooling means includes the condenser and evaporator, respectively, of a refrigeration system.

7. A grain dryer including means defining a gravity flow path for granular material to be dried and laterally through which drying air may be passed, said flow path including inlet and outlet end portions, supply means for supplying granular material to said inlet end portion and discharge means for discharging granular material from said outlet end portion, air passage means including means for passing heated drying air laterally through the inlet end portion and cooled drying air laterally through said outlet end portion, said air passage means defining a substantially closed loop circuit and means for pumping air through said circuit, said air passage means including heating means for heating and drying air immediately prior to its passage laterally through said inlet end portion and cooling means for cooling and dehumidifying said drying air after its passage laterally through said inlet end portion and prior to its passage laterally through said outlet end portion and the grain passing therethrough, said air passage means including bypass means operable to selectively variably bypass portions of air flowing through said air passage means from said cooling means directly to said heating means independent of passage of said portions of air through the grain passing through the outlet end portion of said gravity flow path to enable discharge of dried grain from said outlet end portion of said gravity flow path at or below the ambient temperature rather than at a temperature higher than ambient temperature.

8. The dryer of claim 7 wherein said heating and cooling means includes the condenser and the evaporator, respectfully, of a refrigeration system.

* * * * *